(12) United States Patent
Crinion

(10) Patent No.: US 6,779,043 B1
(45) Date of Patent: Aug. 17, 2004

(54) NETWORK ADDRESS MANAGER

(75) Inventor: Patrick T. Crinion, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/441,290

(22) Filed: Nov. 16, 1999

(51) Int. Cl.[7] .......................... G06F 15/16; H04L 12/56
(52) U.S. Cl. ...................... 709/249; 370/412; 370/423; 370/911; 370/255
(58) Field of Search ................................ 370/412, 392, 370/401, 232, 253, 395.1, 423, 465, 422, 911, 255; 365/49; 711/104, 108; 709/249

(56) References Cited

U.S. PATENT DOCUMENTS

| | | | |
|---|---|---|---|
| 4,791,606 A | * | 12/1988 | Threewitt et al. ............. 365/49 |
| 5,383,146 A | * | 1/1995 | Threewitt .................... 365/49 |
| 5,386,413 A | * | 1/1995 | McAuley et al. ........... 370/392 |
| 5,446,726 A | * | 8/1995 | Rostoker et al. ............ 370/232 |
| 5,684,954 A | * | 11/1997 | Kaiserswerth et al. ...... 370/393 |
| 5,862,338 A | * | 1/1999 | Walker et al. .............. 709/224 |
| 5,917,821 A | * | 6/1999 | Gobuyan et al. ........... 370/392 |
| 6,094,434 A | * | 7/2000 | Kotzur et al. .............. 370/401 |
| 6,098,109 A | * | 8/2000 | Kotzur et al. .............. 709/249 |
| 6,098,110 A | * | 8/2000 | Witkowski et al. ......... 709/249 |
| 6,175,571 B1 | * | 1/2001 | Haddock et al. ............ 370/423 |
| 6,199,140 B1 | * | 3/2001 | Srinivasan et al. ......... 711/108 |
| 6,201,789 B1 | * | 3/2001 | Witkowski et al. ......... 370/230 |
| 6,222,840 B1 | * | 4/2001 | Walker et al. .............. 370/389 |
| 6,233,242 B1 | * | 5/2001 | Mayer et al. ............... 370/392 |
| 6,233,246 B1 | * | 5/2001 | Hareski et al. ............. 370/422 |
| 6,260,073 B1 | * | 7/2001 | Walker et al. .............. 709/249 |
| 6,389,480 B1 | * | 5/2002 | Kotzur et al. .............. 709/249 |
| 6,430,626 B1 | * | 8/2002 | Witkowski et al. ......... 709/249 |

OTHER PUBLICATIONS

"16–Bit LANCAM Routines for an 8–Port 100Base–T Ethernet Switch" ("LANCAM"), MUSIC Semicondutors, Application Note AB–N18, Rev. 1. 1a, Sep. 30, 1998.*

"Reading Out the Valid LANCAM© Memory Entries", MUSIC Semiconductors, Application Brief AB–N4, Rev. 1a, Sep. 30, 1998.*

"Advantages of CAM in ASIC–based Network Address Processing", MUSIC Semiconductors, Application Brief AB–N11, Rev. 1.2a Draft, Sep. 30, 1998.*

* cited by examiner

Primary Examiner—David Wiley
Assistant Examiner—George C Neurauter, Jr.
(74) Attorney, Agent, or Firm—Stallman & Pollock LLP

(57) ABSTRACT

A network device includes a content addressable memory (CAM). The CAM may be accessed by a host processor. The host processor stores active device addresses in the CAM. Each device address is associated with one of the network switch ports. If the network switch receives a packet having a source address not presently stored in the CAM, the network switch adds the source address to the CAM. If the CAM is full of source addresses, the new source address replaces a selected one of the old source addresses.

14 Claims, 6 Drawing Sheets

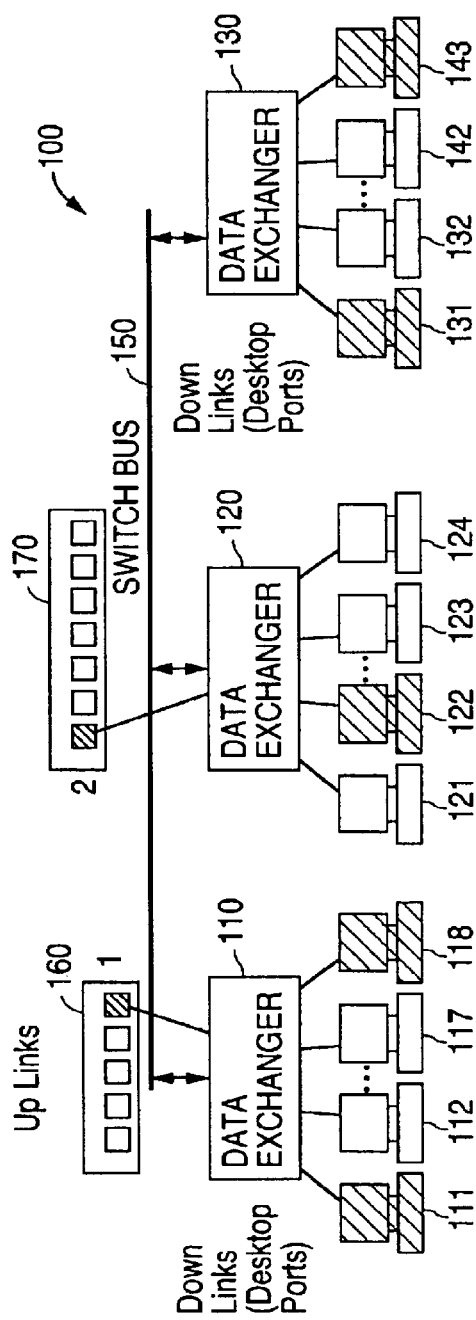
FIG. 1
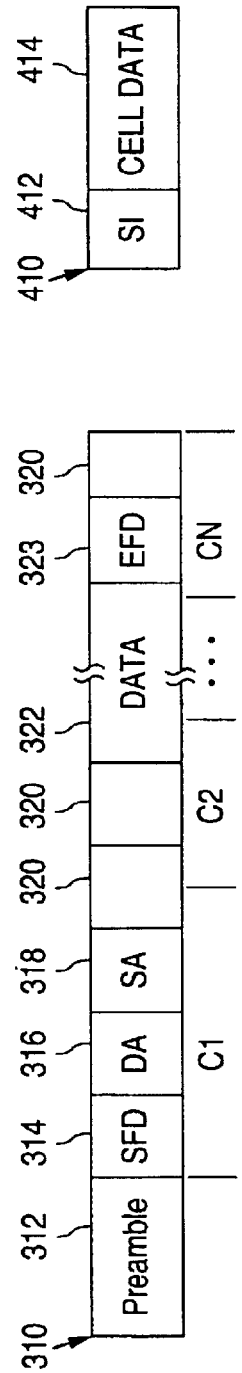
FIG. 3
FIG. 4

NETWORK ADDRESS MANAGER

FIELD OF THE INVENTION

The invention relates generally to exchanging data over a local area network and more specifically to secure port access to a device on a local area network.

BACKGROUND OF THE INVENTION

Local Area Networks (LANs) are commonly used to interconnect computers or other devices. One computer may transmit a packet of data to another computer over the network. The packet includes a source address field, a destination address field, a data field, and other fields. The destination address field is used to route the packet to the appropriate destination.

A LAN may grow to include a large number of devices and to reach a large physical area. For example, a large number of personal computers may be interconnected over a LAN. The personal computers may be spread across a number of locations. Network devices such as routers, hubs, switches, bridges, repeaters and others may be used to divide network traffic and boost network signals. For example, a network switch may be used to divide a network into sub-networks. As a packet may not need to be transmitted to every sub-network, the switch routes the packet to the appropriate sub-network (i.e. the sub-network having a device address which matches the packet's destination address). In this way, a switch is able to reduce traffic within a sub-network.

In order to route the packets, the switch must monitor which devices are connected to the sub-network. This allows the switch to route a packet to the proper sub-network. During operation of a LAN, devices may be added or removed. The switch must monitor this activity so that it is able to properly route packets.

A switch maintains a list of active devices in a memory. As devices are added to the LAN they are added to the list of active devices in the switch's memory. Eventually, the number of devices that have been added to the LAN may exceed the memory capacity of the switch. In some implementations, a switch simply stops learning new addresses after its memory is full. This provides a simple solution to the problem of limited memory, however, the devices stored in memory may no longer be in use. Thus, the switch will not allow for the connection of additional devices even though many of the devices in its memory are no longer in use.

In other implementations, a switch overwrites old addresses when its memory is full. Typically, a switch will attempt to overwrite the oldest entry. To this end, the switch will monitor the entries so that it can identify the oldest. This monitoring can require a significant amount of resources. For example, the switch can monitor the age of an entry using one or more counters. However, the use of such counters adds to the cost and complexity of the device.

SUMMARY OF THE INVENTION

In one preferred embodiment of the invention, a network device receives a plurality of new source addresses through a first port. The network device writes the plurality of new source addresses to a memory. The network device sequentially accesses memory locations within the memory, where at least one of the memory locations is associated with the first port. The network device determines whether a first pointer associated with the first port contains a valid address. Finally, the network device updates the first pointer to select one of the at least one memory locations associated with the first port.

In another preferred embodiment of the invention, a network device provides a plurality of memory locations for storing source address information. The network device cycles through the plurality of memory locations. The network device determines a port identifier for a current memory location. The network device determines when a port associated with the port identifier has an invalid pointer. Finally, the network device updates the invalid pointer with the current memory location.

According to another preferred embodiment of the invention, a network device includes a plurality of ports configured to receive data through a network, where the data includes source address information. The network device also includes a memory operationally coupled with the plurality of ports and having a plurality of memory locations configured to save the source address information. The network device further includes a plurality of pointers each associated with a respective one of the plurality of ports and configured to identify one of the plurality of memory locations. Finally, the network device includes a counter operationally coupled with the memory and configured to identify one of the plurality of memory locations.

BRIEF DESCRIPTION OF THE DRAWINGS

FIG. 1 is a block diagram of one preferred embodiment of a switched network including three data exchangers and two related up-links.

FIG. 3 is block diagram of one preferred embodiment of the division of a frame into cells.

FIG. 4 is a block diagram of one preferred embodiment of a data cell.

DETAILED DESCRIPTION

Figure 2:
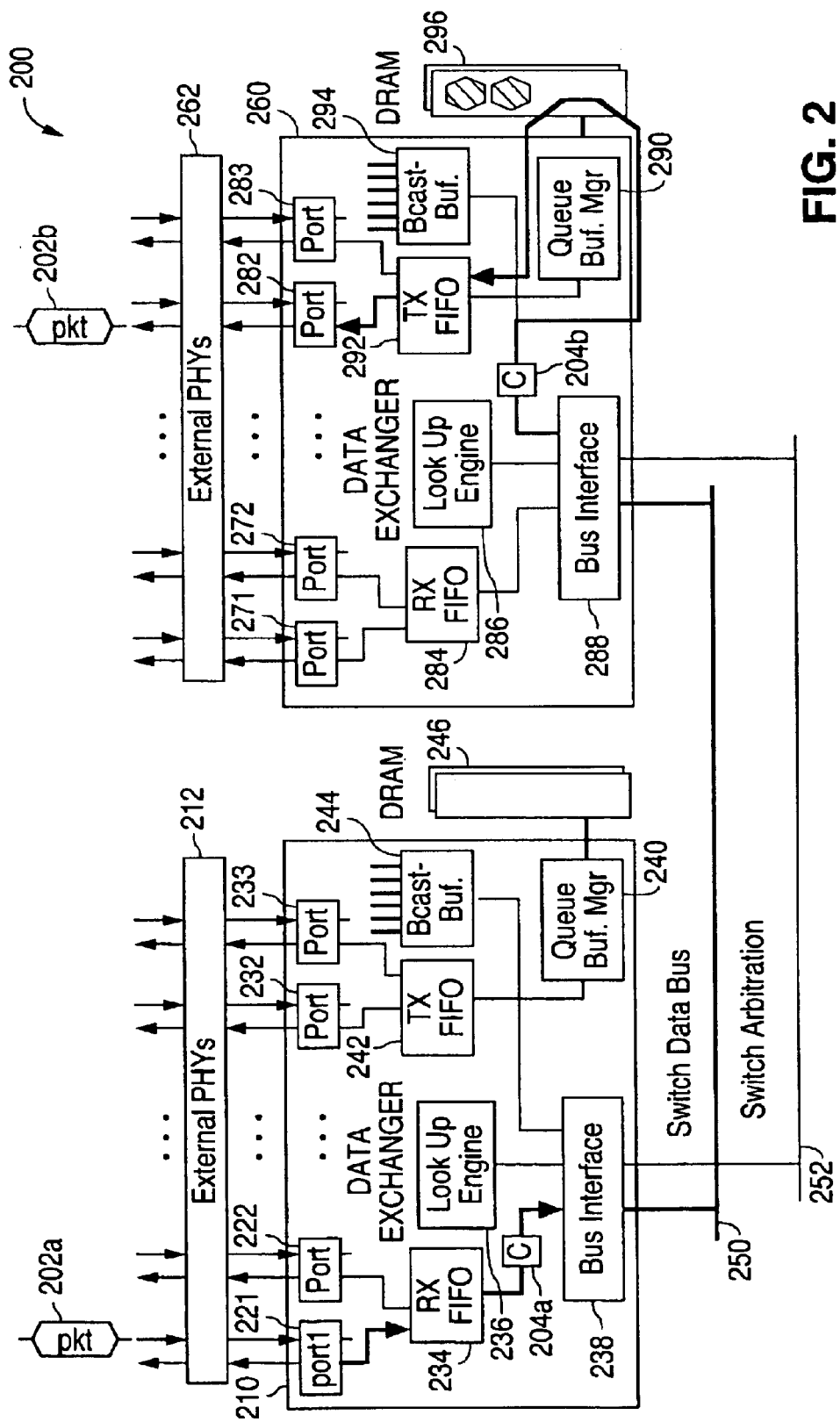
FIG. 2 is a block diagram of another preferred embodiment of a switched network including two data exchangers connected by a switch bus.

Turning to FIG. 1, one preferred embodiment of a switched network 100 including three data exchangers 110, 120 and 130 is described. Data exchangers 110, 120 and 130 connect over a switch bus 150, which allows the data exchangers 110, 120 and 130 to share data. Data exchangers 110, 120 and 130 each connect to a plurality of computers or other devices. Specifically, data exchanger 110 connects to computers 111–118 (113–116 not shown). Data exchanger 120 connects to computers 121–124. Data exchanger 130 connects to computers 131–143 (133–141 not shown).

Data exchangers 110, 120 and 130 are configured to route packet data between the computers. For example, computer 111 may transmit a packet of data with a destination address which matches that of computer 122. When properly routed, the packet passes through data exchanger 110, over switch bus 150, through data exchanger 120 and to computer 122. Other computers may communicate in a similar manner.

In one preferred embodiment, network 100 is configured so that any computer may communicate with any other computer. However, as the number of computers increases so too does the network traffic.

Accordingly, in another preferred embodiment, network 100 is configured to define a plurality of virtual LANs (VLANs). Over a first VLAN, computers 111, 118, 122, 131 and 143 (each shown shaded) are able to communicate. Over a second VLAN, computers 112, 117, 121, 123, 124, 132 and 142 are able to communicate. The division of network 100 into two VLANs reduces traffic over each. This network may be further divided into additional VLANs depending upon the particular network demands.

Each of the computers shown in FIG. 1 may include a sub-network of computers or other devices. Thus, data exchangers 110, 120 and 130 may also act to interconnect sub-networks.

Data exchanger 110 and 120 include an up link 160 and 170, respectively. Up links 160 and 170 provide a connection to an upper-level network, such as an enterprise network. Data exchangers 110 and 120 will forward a packet to the upper-level network through up links 160 and 170, respectively, when the packet's destination address is not matched by another computer connected to switch bus 150. Data exchangers 110 and 120 will also forward multicast and broadcast packets through up links 160 and 170, respectively.

Turning to FIG. 2, another preferred embodiment of a switched network 200 will be described. The switched network 200 includes a first data exchanger 210 and a second data exchanger 260. As shown, the data exchangers 210 and 260 each include several functional blocks that enable high speed routing of packet data. These functional blocks may be implemented using commercially available components such as controllers or processors, or may be specially designed to perform the functionality herein described.

Data exchanger 210 and data exchanger 260 each provide a number of ports for connecting to external network devices. More specifically, data exchanger 210 provides ports 221–233 (ports 223–231 not shown), and data exchanger 260 provides ports 271–283 (ports 273–281 not shown). Ports 221–233 each connect to an external physical layer 212. As shown, the external physical layer 212 may consist of a single device operative to connect each port to a physical network. The physical layer 212 may also consist of a number of separate devices each operative to connect a single port to a network. The physical layer 212 provides the physical connection to a network, and provides a media independent interface to the ports 221–233. Each of ports 271–283 connect to an external physical layer 262. External physical layer 262 provides the same functionality as physical layer 212. Each of ports 221–233 and 271–283 provide media access control functionality for transmitting and receiving data over a network.

Data exchanger 210 connects to data exchanger 260 over a switch bus 250 and a switch arbitration link 252. As will be explained further below, packet data received through a port by data exchanger 210 may be transmitted to data exchanger 260 over switch bus 250. Data exchanger 260 may in turn transmit the packet data through one of its ports. In this way, a network device connected to one of ports 221–233 may transmit data to a device connected to one of ports 271–283. Likewise, a network device connected to one of ports 271–283 may transmit data to a device connected to one of ports 221–133. Although only two data exchangers are shown, additional data exchangers may be connected over switch bus 250 and switch arbitration link 252.

Data exchanger 210 includes a receive FIFO 234, a transmit FIFO 242, and a broadcast buffer 244. Receive FIFO 234 connects to each of the ports 221–233 to receive packet data. Receive FIFO 234 provides temporary storage of frame data prior to sending the data over switch bus 250.

Transmit FIFO 242 connects to each of ports 221–233 to transmit unicast frame data. Transmit FIFO 242 includes a separate FIFO for each port. Transmit FIFO 242 moves data from an external memory 246, through the appropriate FIFO, and to the appropriate port by using the destination address of the unicast frame data.

Broadcast buffer 244 connects to each of ports 221–233 to transmit broadcast and multicast frame data. Broadcast buffer 244 includes a 10 Mb/s and a 100 Mb/s FIFO. These FIFOs also move data from external memory 246 to the appropriate ports.

Bus interface 238 transfers data from receive FIFO 234 to switch bus 250. Bus interface 238 provides low-voltage high-bandwidth drivers for sending data over switch bus 250. Bus interface 238 also reads data from switch bus 250. Bus interface 238 provides header data to the look-up engine 236, and provides frame data to transmit buffer 242 and broadcast buffer 244.

As will be explained further below, bus interface 238 accesses the look-up engine 236 to determine whether to accept data from switch bus 250 and to maintain a routing table. If the data is accepted, the bus interface 238 uses the header data to give buffer manager 240 routing instructions.

Based on the routing instructions, buffer manager 240 stores the data in external memory 246. Buffer manager 240 also tracks memory usage and controls queues in the external memory 246. The queues are used to store data for congested ports.

Data exchanger 260 includes functional blocks that act in the same manner as those of data exchanger 210. Specifically, data exchanger 260 includes a receive FIFO 284, a look-up engine 286, a bus interface 288, a buffer manager 290, a transmit FIFO 292, a broadcast buffer 294, and an external memory 296. These blocks function in the same manner as receive FIFO 234, look up-engine 236, bus interface 238, buffer manager 240, transmit FIFO 242, broadcast buffer 244, and external memory 246, respectively.

The path of a single unicast packet will now be described as it moves from data exchanger 210 to data exchanger 260. To start, a packet 202a is received by the external physical layer 212. When operating properly, a first packet will be received completely before another packet is received by the same port. The external physical layer 212 translates the packet 202a into frame data, which is provided over a media independent interface to port 221. The translation converts the media dependent packet data into nibble wide NRZ format.

Port 221 monitors the incoming data for a start-of-frame delimiter (SFD). Upon receipt of the SFD, port 221 divides the frame data into 48-bit cells. The cells are then passed to receive FIFO 234. When the number of cells in receive FIFO 234 exceeds a drain threshold, data exchanger 210 asserts a switch bus request over switch arbitration link 252. If it wins an arbitration, it will then transmit the first cell 204a stored in receive FIFO 234 over switch bus 250. Receive FIFO 234 will continue transmitting cells until all cells have been transmitted.

Data exchanger 260 monitors switch bus 250. Look-up engine 286 parses the first cell 204b to determine whether the destination address field matches that of any active devices connected to ports 271–283. In this example, look-up engine 286 determines that the destination address field matches that of an active device connected to port 282. In response, look-up engine 286 provides a match signal back to data exchanger 210, and directs buffer manger 290 to reserve a buffer in memory 296. The buffer in memory 296 is large enough to store the entire frame in contiguous memory locations. As subsequent cells from the same frame are received, the buffer manager 290 sequentially stores the cells in the contiguous memory locations.

When the number of cells stored in the buffer exceed a drain threshold, the data is passed to transmit FIFO 292. Again, the transmit FIFO 292 includes a separate FIFO for each of ports 271–283. The data is provided to the transmit FIFO associated with port 282. The transmit FIFO associated with port 282 converts the 48-bit wide data to nibble wide data. This data is provided over a media independent interface to the physical layer 262. The physical layer 262 translates the data into a packet 202b, which is transmitted over a network connection.

Broadcast or multicast packets have a similar data flow. The buffer manager 290 stores the cell data into contiguous memory locations within memory 296. When the number of cells stored in the memory 296 exceed a drain threshold, the data is passed to broadcast buffer 294 instead of transmit FIFO 292. Again, broadcast buffer 294 includes a 10 Mb/s buffer and a 100 Mb/s buffer. Both of these buffers provide the data to ports 271–283. Depending upon the external physical layer 262, the respective port provides either the 10 Mb/s or the 100 Mb/s data over a media independent interface to the physical layer 262. The physical layer 262 translates the data into packets, which are transmitted over the respective network connection.

Turning to FIG. 3, a preferred process by which ports 221–233 divide frame data into cells is described. A data frame 310 begins with a preamble field 312, an SFD field 314, a destination address field 316 and a source address field 318. The data frame 310 also includes fields 320, which may contain priority, type, length, VLAN or other data. The data frame 310 further includes a variable length data field 322, and an end of frame delimiter (EFD) field 323.

As a frame is received over a port, the frame is divided into 48-bit widelcells. For example, data frame 310 is divided into cells C1, C2, . . . CN. The first cell C1 will include the destination address field 316, however, subsequent cells (i.e. C2, . . . CN) will not. Ordinarily, the destination address field allows a network to route data to the proper destination. However, as the subsequent cells do not include the destination address field they cannot be routed based on the destination address field. Accordingly, a source port identifier is attached to the cells. The cells are then routed based on the source port identifier.

Turning to FIG. 4, a cell 410 is shown. The cell 410 includes a source information field 412 and a data field 414. In a preferred embodiment, each data exchanger has a maximum of 13 ports and a maximum of 13 data exchangers may be cascaded together over a switch bus. Accordingly, the maximum number of ports is 156, and 8-bits of source information field 312 are sufficient to identify uniquely each source port. Source information field 412 also includes speed and type information relating to the source port. The speed information identifies whether the source port operates at 10 Mb/s, 100 Mb/s or another speed. The type information indicates whether the cell data is part of an ATM OC3 frame, an ATM OC12 frame, a reserve frame, or another type frame. The data field 414 contains 48-bit portions of a frame such as one of cells C1 . . . CN from FIG. 3. Source information field 412 may also contain other type information such as that used to identify the appropriate VLAN.

As discussed above, the incoming frame data is divided into cells and placed in a receive FIFO. The cells are then transmitted over a switch bus, and received by another data exchanger. While receiving cells, a data exchanger maintains a routing table, which associates the source identification field with the frame destination. As only the first cell contains the destination address field, the routing table enables the data exchanger to properly route the subsequent cells, which do not have a destination address field.

As mentioned above, the look-up engine 236 is responsible for determining whether to accept data transmitted over the switch bus 250. To do so, look-up engine 236 must monitor the addresses of devices which are currently connected to data exchanger 210. Accordingly, look-up engine 236 maintains a set of active device addresses.

Figure 5:
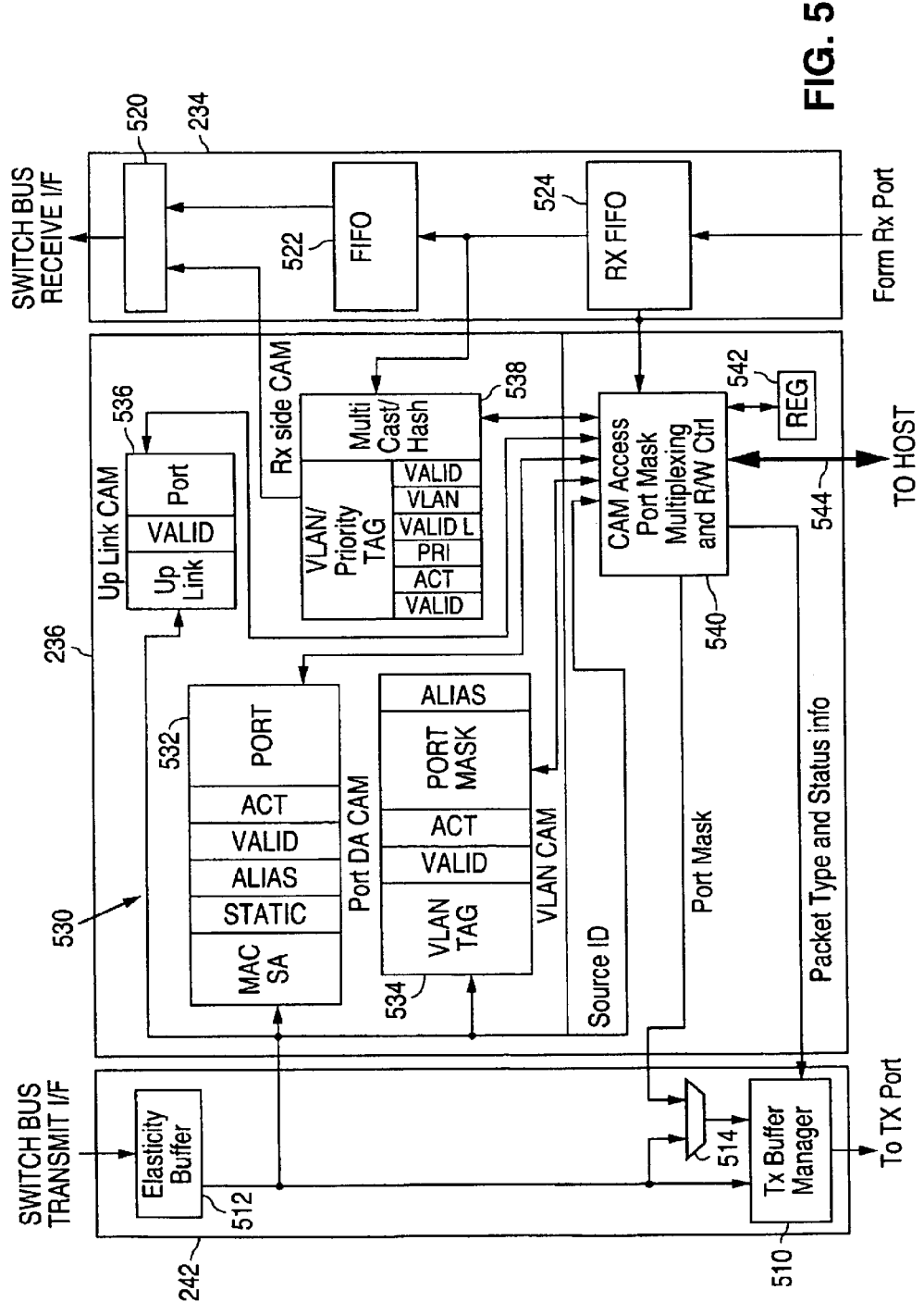
FIG. 5 is a block diagram of one preferred embodiment of the look-up engine of FIG. 2.

Turning to FIG. 5, a preferred embodiment of the look-up engine 236 of FIG. 2 is described. Look-up engine 236 is responsible for learning, storing, and maintaining address, port and VLAN information, which it uses in making packet forwarding decisions. The look-up engine 236 forwards or filters packets based on configuration information, packet type, stored address, port and VLAN information. When look-up engine 236 receives packet information through buffer 512 from over a switch bus, it determines the ports (if any) to which the packet must be sent. If it does determine that the packet must be sent to a port, it then informs transmit FIFO 242. More specifically, content addressable memory (CAM) manager 540 informs a transmit buffer manager 510 by inserting a port bit-mask into an-information field of the first cell of the packet. The CAM manager 540 provides the port bit-mask through multiplexer 514.

When look-up engine 236 receives packet information through FIFO 524 from a network device, it determines source port, address and priority information. Based on this information, look-up engine 236 determines priority for loading into FIFO 522. Before transmission over a switch bus, the look-up engine 236 attaches VLAN and priority information through buffer 520.

Look-up engine 236 performs look ups in CAMs 530 on packet information from both receive FIFO 234 and the switch bus. Look ups on packet information from the receive FIFO 234 are performed for VLAN and/or priority substitution before transmission on the switch bus. The packet information is then provided to the switch bus. The packet information sent by a data exchanger is then monitored by the same data exchanger and by other data exchangers. Look ups on packet information from the switch bus are performed for forwarding and media access controller (MAC) learning decisions. Both learning and forwarding will be described in further detail below.

The CAMs 530 allow the look-up engine 236 to make forwarding decisions based on: (1) a destination address; (2)

a VLAN tag; and (3) an up-link ID of the packet as it is received from the switch bus. The CAMs 530 include four separate content addressable memories: (1) a source address memory 532, with a port ID number tag used for forwarding unicast packets; (2) a VLAN memory 534 with a port mask tag for mapping VLAN tagged packets; (3) an up-link memory 536 with a port address tag that is used to determine to which up-link port a packet (with unknown destination address or a broadcast) should be sent; and (4) a multicast memory 538 with VLAN ID tag fields for implementing multicast video streams using VLANs or associating a VLAN with a particular conversion.

Source address memory 532 is capable of supporting 128 source addresses per data exchanger. There is one dedicated location per port (13 total reserved). There are 115 floating memory locations that can be shared amongst the 13 ports. These 115 locations can be used on a first-come first-serve basis or each port can be allocated a maximum number that it can use. Each port may be configured to have maximum address quotas of 4, 8, 16 or 24. The quota feature can be enabled on a per port basis by setting a quota enable bit in configuration register 542. The maximum number of locations reserved for a given port is programmable through a quota field in the configuration register 542. The data exchanger maintains a CAM location usage (CLU) counter for each of its ports. The CLUs are accessible by host software. This counter reflects the number of source address memory locations that are assigned to that port. When the CLU counter for a given port equals the quota programmed for that port, the available memory locations for that port are exhausted.

There are 192 locations in VLAN memory 534. Look ups are performed on the transmit side of the switch bus by the destination data exchanger. The VLAN tag field of a packet received from the switch bus is compared with the VLAN memory contents to determine its VLAN membership. When the destination data exchanger detects a group address resolution protocol request for a change in VLAN membership, or when the destination data exchanger detects a VLAN mismatch, the packet in question is forwarded to a 13th port or optionally the up-link port. This allows a management entity to process the packet as desired. The management entity is also responsible for initializing the membership of the specified VLANs.

The contents of up-link memory 536 are programmed at configuration over host interface 544. The contents of up-link memory indicate the addresses of an upper-level network.

There are 192 locations in multicast memory 538 that may be programmed to associate a given multicast address or source-address/destination-address type hash with a specific VLAN. This memory may also be used to associate based on priority. If a packet is received whose destination address matches an address contained in the multicast memory 538, then those ports that are members of the specified VLAN will participate in the frame's transmission. Look ups of the multicast memory 538 are performed on the receive side of the switch bus by the source data exchanger.

Each of the memories 532, 534, 536 and 538 have a valid tag bit associated with each of their entries. The valid tag bit indicates that the associated data is valid. Each of the memories 534, 536 and 538 also have an activity bit associated with each entry. These are used to monitor usage of the associated entry.

Upon receiving a packet from a port, a data exchanger divides the packet into cells and forwards the packet over the switch bus or to the appropriate port. The other data exchangers must monitor the switch bus to determine whether the destination address of the packet matches that of a device connected to one of its ports. If so, the data exchanger receives the packet data and forwards it to the appropriate port. To make the determination as to whether to forward the packet to a particular port, the data exchanger maintains the memories 532, 534, 536 and 538.

Figures 6, 7:
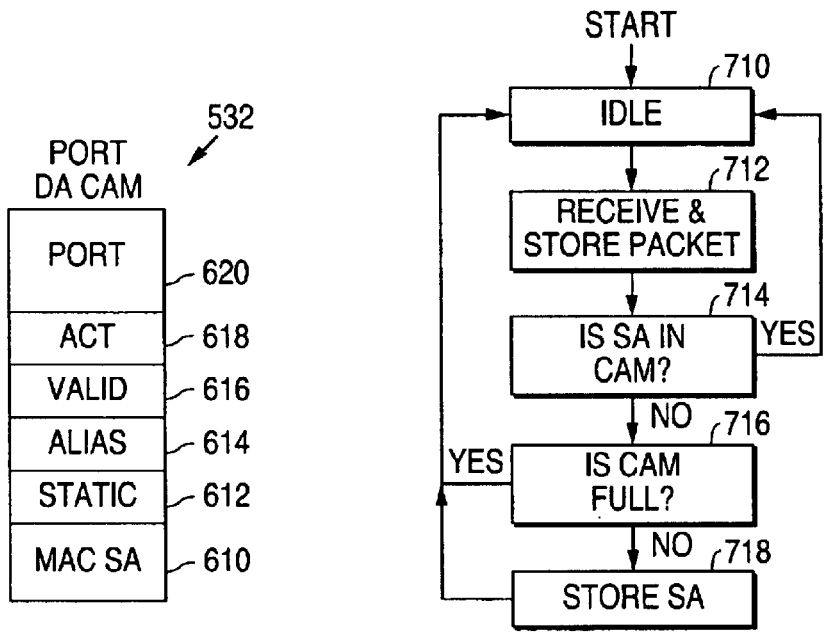
FIG. 6 is a block diagram of the source address memory of FIG. 5.
FIG. 7 is a flow chart of one preferred operation of the look-up engine of FIG. 5 in a first-heard mode.

Turning to FIG. 6, one preferred embodiment of the source address memory 532 is described. As mentioned above, the source address memory is divided into a plurality of locations each configured to store information related to one source address. Each of the memory locations includes a source address field 610, a static field 612, an alias field 614, a valid field 616, an ACT field 618 and a port field 620.

The source address field 610 holds the source address of a network device. The valid field 616 indicates whether the memory location holds valid data. At initialization, all valid fields are cleared. These fields are set as source address information is added to the associated memory location.

The static field 612 indicates whether the associated memory location holds static or dynamic data. When the static field 612 is set to static, the associated memory location cannot be overwritten with new data. When operating in a programmed mode, after receiving address information from a host processor, this field is set. Accordingly, the associated memory location will not be overwritten, unless an error condition such as a loop is detected.

The alias field 614 indicates that data sent to the associated address should also be sent to an alias address. An alias address allows another node to monitor traffic.

The activity field 618 is set whenever the associated address receives data. This allows a background process to determine which addresses are currently active. In a last-heard learning mode, the oldest learned addresses may be overwritten. The port field 622 identifies which port is connected to the device having the associated source address.

The address information of the source address memory 532 must be learned or programmed. As shown in FIG. 5, the look-up engine 236 can learn the addresses information by monitoring network traffic through receive FIFO 234. Alternatively, the look-up engine 236 can be programmed over host interface 544.

The look-up engine 236 supports four such learning and programming modes: (1) first-heard mode; (2) last-heard mode; (3) programmed mode; and (4) secure programmed mode. Each port is individually configurable to select one of these four modes. The modes are selectable over host interface 544 by setting configuration register 542.

First-heard learning stores the source addresses of the nodes connected to its ports. It will store as many addresses as there are allocated memory locations (there is one reserved memory location per port, plus any additional quota reserved for the port). Once the allocated memory locations for the port are exhausted, any new addresses will not be learned. Any new source addresses will then be considered as an intrusion. The source address is not learned, but a source address mismatch (SAM) bit is set in a status register. The source address is also captured in an address register.

Turning to FIG. 7 a preferred operation of a data exchanger in the first-heard mode is described. The data exchanger begins at block 710 where it enters an idle state. In the idle state, the data exchanger monitors for an incoming packet over its ports. Upon receiving a packet, the data exchanger proceeds to block 712. Here, the data exchanger stores the incoming packet data in a FIFO. At block 714, the data exchanger compares the source address of the received packet to the source addresses contained in memory. If this comparison generates a match, the data exchanger transmits the packet over a switch bus or to another port as bandwidth permits. The data exchanger then returns to an idle state at block 710.

If, however, the comparison does not generate a match, the data exchanger determines whether the memory is full at block 716. If so, the data exchanger transmits the received packet but the new source address is not learned. The source address is stored in an address register, and a SAM bit is set in a memory status register. The data exchanger then returns to the idle state at block 710.

Otherwise, if the memory is not full at block 716, the data exchanger adds the source address to memory. The data exchanger transmits the packet over the switch bus or to another port as bandwidth permits.

Last-heard learning mode will also store the source addresses of the nodes connected to its ports. More specifically, each port is assigned a quota that represents the maximum number of source addresses that may be stored for that port. The sum of the quotas for all ports may exceed the total available memory locations. However, each port is guaranteed at least one memory location.

As new source addresses are received through a port, they are written to memory, or stored in an unused memory location. Once a port uses a memory location then the memory location cannot be used by other ports. When a port exhausts its quota or when there are no available memory locations, an old source address for that port is overwritten. The location to be overwritten is determined by a background process that continuously cycles through all locations, performing reads of the tag field to determine the port ID and if the address is a static entry.

The background process reads a tag bit associated with each memory entry, which (when set) indicates that the location was programmed by the host processor and is "static," i.e., should not be overwritten when configured for last-heard learning mode. For each port there is an 8-bit register which is a pointer to the next memory location which should be used for a last-heard overwrite. The background process reads a location, and if the port is in last-heard mode, it checks if the overwrite pointer register has valid contents. If not, and the location is not designated as static, it updates the overwrite pointer. Quotas, static bits, and learning modes must be programmed so that a port in this learning mode always has a non-static location available. Otherwise, a new address will not be learned.

The process also invalidates entries for ports which have lost a link. In this case, the overwrite pointer will not be updated with this location and the process will check if the pointer already contained this location. If so, the process invalidates the entry. One preferred background process and related memory structures suitable for selecting the new overwrite pointer in last-heard learning mode will be further described below.

Figure 8:
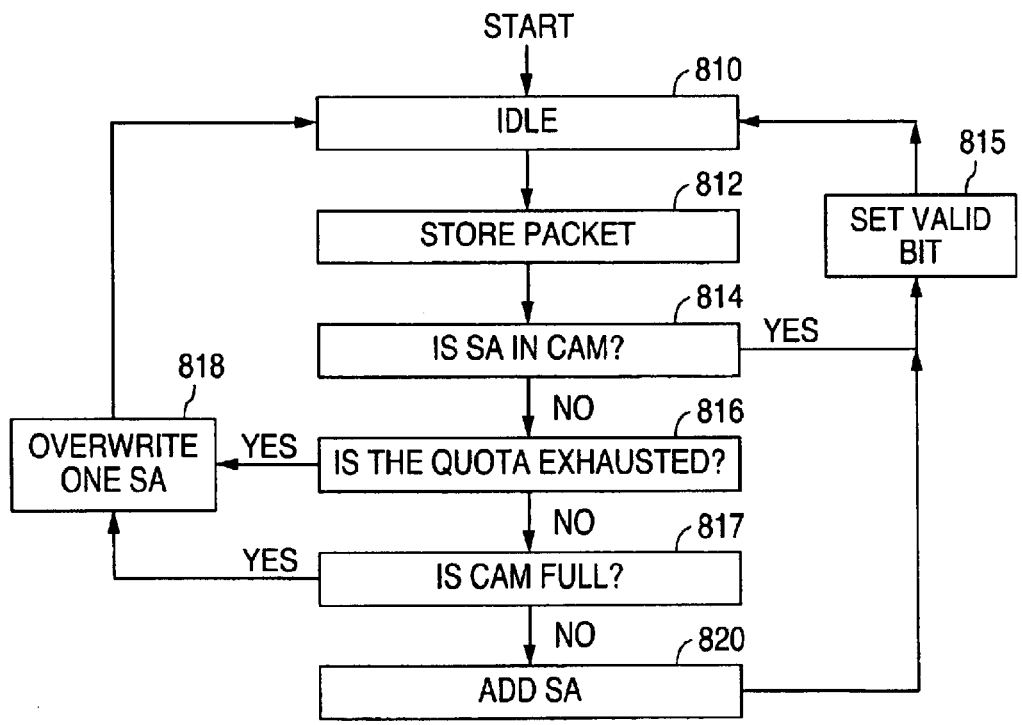
FIG. 8. is a flow chart of one preferred operation of the look-up engine of FIG. 5 in a last-heard mode.

Turning to FIG. 8, a preferred implementation of last heard learning mode will be described. The data exchanger begins at block 810 where it enters an idle state. In the idle state, the data exchanger monitors for an incoming packet over its ports. Upon receiving a packet, the data exchanger proceeds to block 812. Here, the data exchanger stores the incoming packet data in a FIFO. At block 814, the data exchanger compares the packet's source address to those in memory. If the source address matches one such address, the data exchanger transmits the packet over a switch bus or to another port as bandwidth permits. The data exchanger then proceeds to block 815 and sets the valid bit in the CAM for the related source address. The data exchanger then returns to an idle state at block 810.

If, however, the source address does not match any address contained in memory, the data exchanger determines whether the port has exhausted its quota at block 816. If so, at block 818, the data exchanger overwrites a source address stored in memory with the new source address of the received packet. The memory location for storing the new source address is selected by a background process. The background process uses a pointer to identify the selected memory location. After the new source address is written to the selected memory location, a valid bit (described further below with reference to valid bit 1014 of FIG. 10) associated with the pointer is reset. The data exchanger also transmits the packet over the switch bus or to another port as bandwidth permits. The data exchanger then returns to the idle state at block 810.

Otherwise, if the port has not exhausted its quota at block 816, the data exchanger proceeds to block 817. Here, the data exchanger determines whether the memory is full. If so, the data exchanger proceeds to block 818 as described above. Otherwise, at block 820, the date exchanger adds the new source address to an unused memory location. The date exchanger then proceeds to block 815.

The third mode, programmed mode, forces a host processor to manually write the source addresses through a host interface. No actual learning occurs, as with the previously mentioned modes. In this mode, a received frame is considered to be an intrusion if the source address is not matched in the memory. If an intrusion is detected, the source address is not learned, but the mismatch bit is set in the memory status register and the source address is captured in an address register. In the programmed mode, ports are not disabled upon detection of an intrusion.

Secure programmed mode is the same as programmed mode except when an intrusion is detected, the port on which the intrusion packet was received is disabled. The mismatch bit is set in the memory status register, and the source address is stored in an address register. In a preferred embodiment, when a port is disabled, it is no longer able to transmit or to receive data. Alternatively, a port may be disabled by eliminating only one of the transmit and receive functions.

Figure 9:
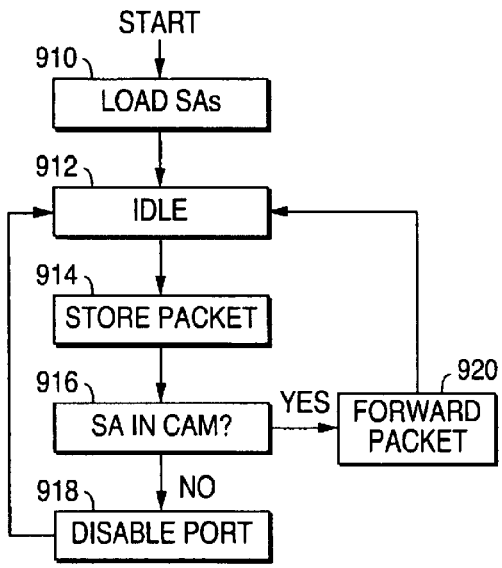
FIG. 9 is a flow chart of one preferred operation of the look-up engine of FIG. 5 in a secure-programmed mode.

Turning to FIG. 9, a preferred operation of the data exchanger in secure programmed mode will be described. The data exchanger begins at step 910. Here the data exchanger receives programmed addresses from a host processor over a serial interface. The programmed addresses are stored in memory. After all programmed addresses have been loaded, the data exchanger is ready to enter an idle state at step 912. In the idle state, the data exchanger monitors for an incoming packet over its ports. Upon receiving a packet, the data exchanger proceeds to block 914. Here the data exchanger stores the incoming packet data in a receive FIFO. At block 916, the data exchanger compares the source address of the received packet to the programmed addresses contained in memory. If the comparison generates a match, then at block 920 the data exchanger transmits the packet over a switch bus or to another port as bandwidth permits. The data exchanger then returns to an idle state at block 912.

If, however, at block 916 the source address does not match any programmed address contained in memory, the data exchanger proceeds to block 918. Here, the data exchanger discards the received packet. The source address is stored in an address register, and a mismatch bit is set in a memory status register. The data exchanger also disables the port so that no additional packets may be transmitted or received over that port. The data exchanger then returns to the idle state at block 912. The port remains disabled until it is reset by a host processor or upon resetting of the data exchanger.

In another preferred embodiment, at block 918, the data exchanger forwards the received packet. The data exchanger also disables the port so that no packets may be transmitted over that port, however, additional packets may be received over that port.

In the learning modes, addresses are not learned from packets which are received with CRC, frame alignment, or size errors. This is achieved by delaying the transfer of a learned address into the source address memory until the EOF cell of the packet has been received from the switch bus and found to be error free. The matching of a packet's source address is performed during the SOF cell and the source address is stored in an SRAM. This source address is written into the source address memory when the entire packet is received without error (EOF cell).

The look-up engine 236 forwards packets received from the switch bus based on destination address and VLAN tag. The destination port(s) of a packet are determined when the first SOF cell is received off the switch bus. Subsequent cells are then forwarded based on their source port ID in the information field.

More specifically, the look-up engine monitors the switch bus for SOF cells. Upon receipt of an SOF cell, the look-up engine compares its destination address field to those contained in the source address memory. If this comparison generates a match, the rest of the packet data is received and the packet is forwarded to the appropriate port(s) based upon the forwarding information contained in the CAM.

The CAM manager 540 is responsible for managing the allocation and de-allocation of CAM addresses. A list of currently unused (and available to any port) CAM locations are stored in an SRAM. Upon reset, the SRAM is initialized to point to each of the locations in the CAM that are not currently reserved for a particular port.

Each CAM location has an associated valid bit which can be reset to indicate that the address should no longer be used when matching. It also has a frame activity bit which is set each time there is a source address match on that address. This bit is also periodically reset by the CAM manager and is used to determine aging of addresses.

Figure 10:
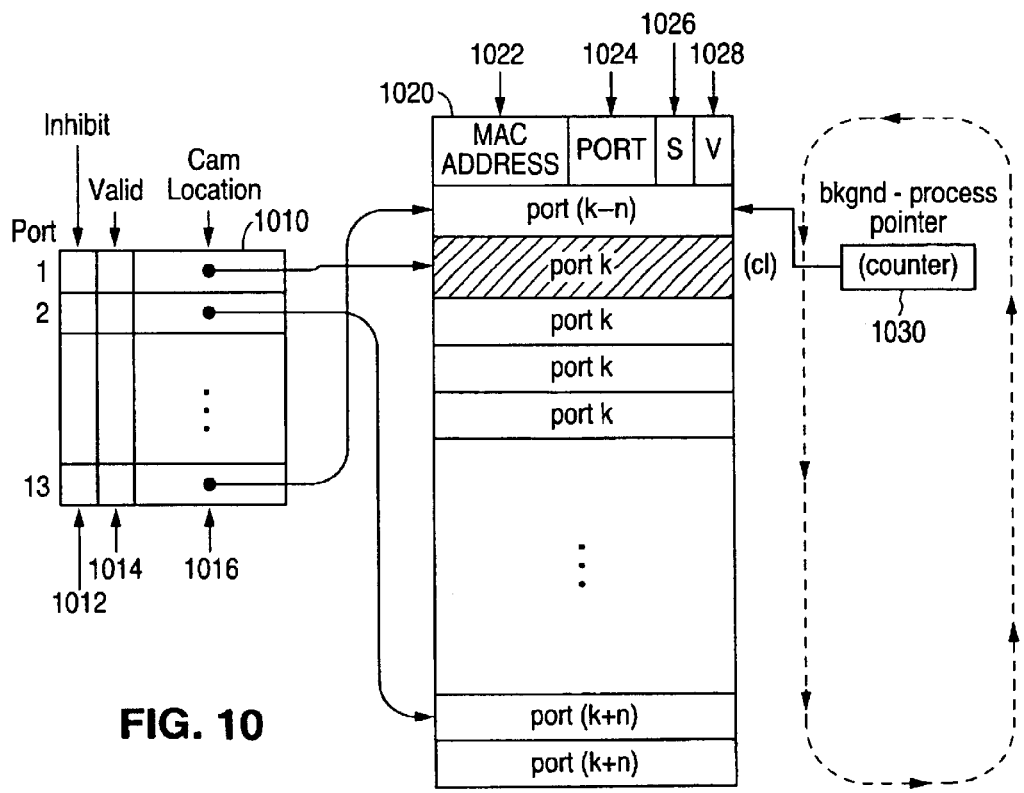
FIG. 10 is one preferred memory structure used to implement the last-heard mode of FIG. 8.

Turning to FIG. 10, a preferred memory structure used to implement the last-heard learning mode will be described. The memory structure includes a register set 1010 and a CAM 1020. Register set 1010 includes one register for each port (1–13). Each register includes an inhibit bit 1012, a valid bit 1014, and a pointer 1016 to a CAM location. During operation, if valid bit 1012 for a port is set, and the inhibit bit is not set, then the related pointer 1016 indicates the next CAM location that should be overwritten by a new source address. Once this CAM location is used, the valid bit is reset and a background process identifies the next CAM location that should be overwritten and updates the pointer to select such CAM location. If the inhibit bit is set, the background process will not update the memory location.

The CAM 1020 includes a plurality of memory locations. Each memory location includes a MAC address 1022, a port identifier 1024, a static bit 1026, and a valid bit 1028. Static bit 1026 is set if the source address has been programmed. If so, then this memory location is ignored by the background process so that the programmed source address will not be overwritten. Valid bit 1028 is set if the memory location contains a valid source address. During operation, a background process cycles through the CAM 1020. Memory locations within CAM 1020 are sequentially selected using a counter 1030. When counter 1030 reaches the end of CAM 1020, the counter is reset so that it again points to the first memory location in CAM 1020.

Figure 11:
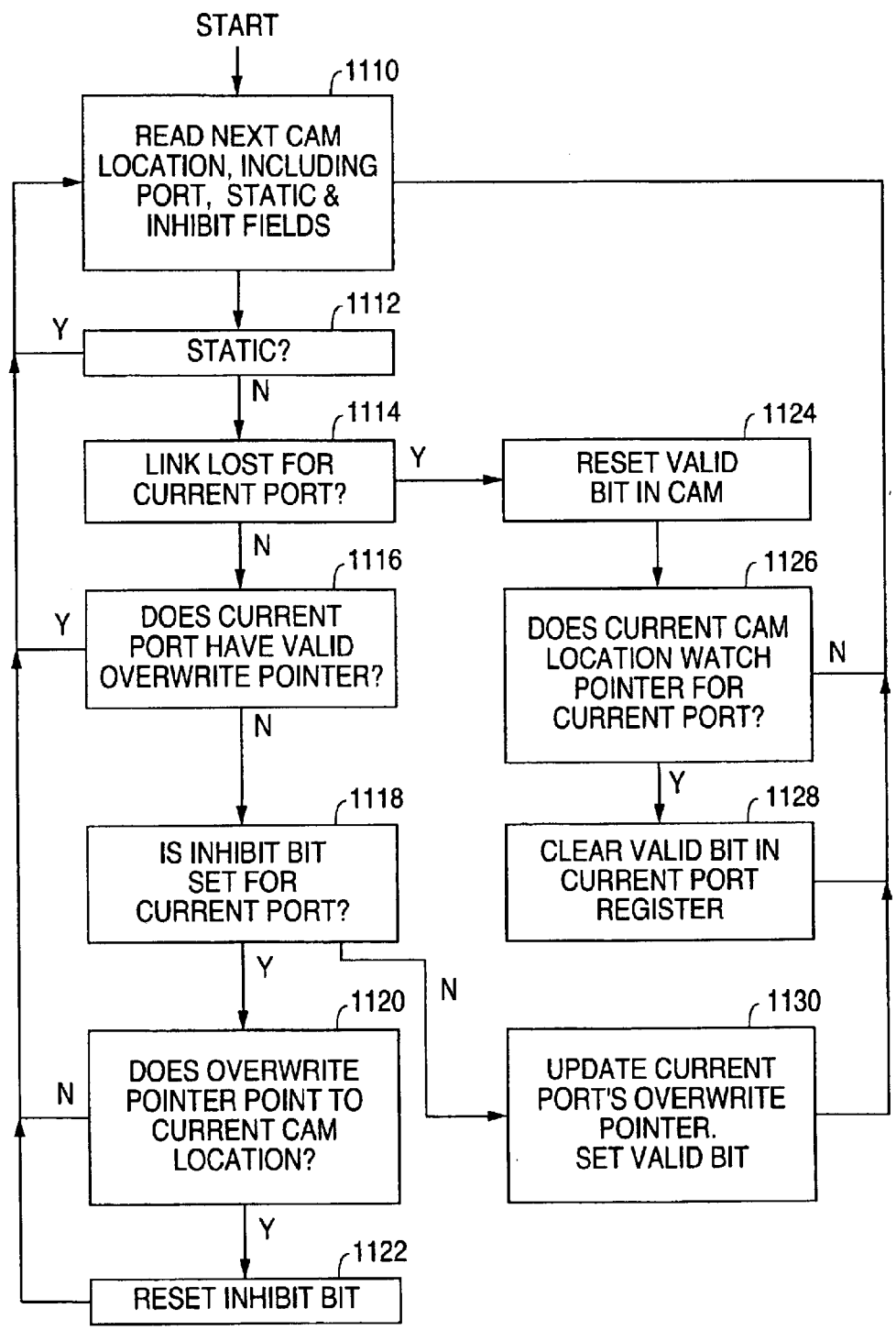
FIG. 11 is a flow chart of one preferred process for updating an overwrite pointer in last-heard mode of FIG. 8.

Turning to FIG. 11, a background process for selecting the next overwrite pointer will be described. The process begins at block 1110, where the background process reads the next CAM location including port identifier 1024, static bit 1026, and valid bit 1028. At block 1112, the background process determines whether the static bit 1026 is set. If so, the memory location has been programmed and should not be overwritten. Accordingly, the background process returns to block 1110. Otherwise, the background process proceeds to block 1114 where it determines whether a link has been lost for the current port.

Each of the ports determines if it has lost a link and indicates to the background process if any have lost link, by asserting a signal (one per port). As the background process cycles through the CAM locations, examining each to determine the port with which it is associated, it checks if the link lost signal for that port is asserted. If so it knows that the location should be invalidated. If the location happened to be the one to which the overwrite pointer was pointing then it knows that the overwrite pointer must also be invalidated.

If a link has not been lost, the background process proceeds to block 1116 where it determines whether the current port has a valid overwrite pointer. The current port is the port identified by port identifier 1024. The background process determines whether the overwrite pointer is valid by looking at the valid bit 1014 associated with the current port. If the current port does have a valid overwrite pointer, the background process returns to block 1110. If the current port does not have a valid overwrite pointer, the background process proceeds to block 1118. Here, the background process determines whether inhibit bit 1012 is set for the current port. If so, the background process proceeds to block 1120. Here, the background process compares the address of the current CAM location (or the contents of counter 1030) with the address stored in the pointer 1016 of the current port. If these do not match, the background process returns to block 1110. Otherwise, the background process proceeds to block 1122 where the background process resets the inhibit bit 1012. The background process then returns to block 1110.

Returning to block 1124, if the background process determines that a link has been lost for the current port, the background process resets the valid bit 1028 for the current CAM location. The background process then proceeds to block 1126, where it determines whether the address of the current CAM location (or the value of counter 1030) matches the address stored in pointer 1016 for the current port. If these match, the valid bit 1014 for the current port is reset at block 1128. The process then is returns to block 1110. Likewise, if the current CAM location does not match the pointer for the current port, the background process returns to block 1110.

Returning to block 1118, if the inhibit bit is not set for the current port, the background process proceeds to block 1130. Here, the background process updates the current ports overwrite pointer. The background process also sets the valid bit 1014 for the current port. The background process then returns to block 1110.

The inhibit bit is set when the overwrite pointer is invalidated. The background process will then try to find another location to become the overwrite location for that port and set the overwrite pointer to point to it. Without the inhibit bit, the background process will do this the next time it finds a location associated with that port.

Figure 12:
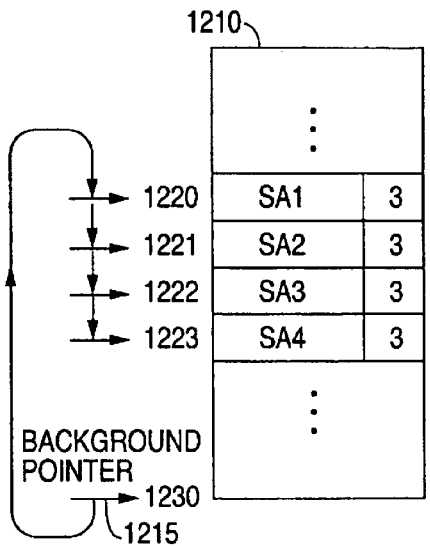
FIG. 12 is a memory structure used to implement a look-up engine.

Turning to FIG. 12, the operation of the background process without the use of an inhibit bit will be described with reference to a specific example. When, for example, an address needs to be added for port 3 and there is not a free location available for this new address, an existing address must be overwritten. As shown, port 3 currently has 4 CAM locations used (locations 1220, 1221, 1222, 1223) and the overwrite address is location 1220.

In typical operation, the background process cycles through the CAM 1210 so that when the new address is added, and the overwrite pointer invalidated, the background process pointer 1215 will have cycled ahead to, for example, location 1230. Accordingly, location 1220 is reused/overwritten with the new address and the overwrite pointer for port 3 invalidated. Now the background pointer tries to find a new location to be the overwrite. Accordingly, the background process cycles through the CAM 1210 looking for a location belonging to port 3. Eventually it reaches location 1220. This is the first location it encounters belonging to port 3 so it nominates 1220 as the next overwrite location, and updates port 3's overwrite pointer to point to location 1220. When a new packet comes in on port 3 with a new address that needs to be added, location 1220 gets overwritten again even though it was only very recently overwritten. The use of inhibit bit 1012 (shown in FIG. 10) avoids this type of operation.

Specifically, when location 1220 is reused for the new address, the overwrite pointer is marked invalid as before, but also it's inhibit bit is set. The inhibit bit inhibits the background process from updating the overwrite pointer with a new location. The overwrite pointer still contains a pointer to location 1220.

As before the background process cycles around until it reaches location 1220. Again it sees that location 1220 belongs to port 3 and that port 3 needs its overwrite pointer updated. The background process, however, does not update the overwrite pointer because port 3 has its inhibit bit set.

Instead it determines that port 3's overwrite pointer contains a pointer to location 1220, meaning that 1220 was the address overwritten. Since it has now reached 1220 it can reset the inhibit bit, allowing the overwrite pointer to be updated when the background process next finds a location associated with port 3. In this case, the next location will be location 1221. So 1221 becomes the new overwrite location. Similarly when 1221 gets overwritten by the next new address, the process will identify 1222 for the next overwrite. Only when 1221, 1222, and 1223 have been used for overwrites will 1220 again be identified.

In operation, the background process operates to maintain an overwrite pointer for each port. Although the background process does not ensure that the oldest unused CAM location for each port will be overwritten, in practice, the oldest CAM locations will eventually be cycled out of the CAM and the most recently used source addresses will be saved in the CAM. Moreover, the above described background process avoids the need for maintaining a separate counter for each port. That is, only one counter need be implemented to cycle through the CAM.

Although the embodiments described herein are with reference to a data exchanger having a specific structure, the present invention can be implemented in a variety of other network devices without departing from the scope of the invention. Such other network devices may implement the invention using the functional blocks or memory elements described herein or may implement other configurations to perform the same functionality. Those having ordinary skill in the art will certainly understand from the embodiments disclosed herein that many modifications are possible without departing from the teachings hereof. All embodiments and all such modifications are intended to be encompassed within the following claims.

I claim:

1. A method of managing source addresses in a network device connected to a local area network, the network device including a plurality of ports connected to receive information packets from the local area network, wherein each received information packet includes a source address, the method comprising:

selecting one of a plurality of learning modes for each of the plurality of ports in the network device;

receiving a packet of information from the local area network through a first port of the network device and determining the source address included in the packet;

determining whether one of a plurality of source address entries in a source address memory of the network device contains said source address, and setting a valid bit for said one of a plurality of source address entries when said one of a plurality of source address entries contains said source address;

storing said source address according to the selecting one of a plurality of learning modes for each of the plurality of ports in the network device as one of the plurality of source address entries in the source address memory when no source address entry contains said source address and the source address memory is not full; and checking a static bit for at least some of the plurality of source address entries in the source address memory and storing said source address to one of said plurality of source address entries, in place of the oldest source address entry having a dynamic value of the static bit, when no source address entry contains said source address and the source address memory is full.

2. A method according to claim 1, further comprising:

using a look-up engine to determine whether a destination address of the packet matches any destinations connected to any of the plurality of ports; and transmitting the packet through a data exchanger to an appropriate port of the plurality of ports, where the appropriate port is connected to the destination matching the destination address.

3. A method according to claim 1, further comprising:

moving an overwrite pointer to the oldest dynamic source address entry in the source address memory before receiving the packet of information, such that a source address entry for said source address can quickly be written over the oldest dynamic source address entry.

4. A method according to claim 1, further comprising:

determining whether said source address is static; and writing a static bit to the source address entry for said source address in the source address memory.

5. A method according to claim 1, further comprising:

dividing the received packet of information into cells and passing the cells to a FIFO buffer.

6. A method according to claim 1, further comprising:

storing the packet of information in buffer memory until at least one of an End of File (EOF) tag is received and the entire packet is received error free.

7. A method according to claim 1, wherein:

the plurality of learning modes contains learning modes selected from the group consisting of: first-heard mode, last-heard mode, programmed mode, and secure programmed mode.

8. A method according to claim 1, further comprising:

storing the packet of information in buffer memory until at least one of the EOF tag is received and the entire packet is received error free.

9. A method according to claim 1, further comprising:

using a look-up engine to determine whether a destination address of the packet matches any destinations connected to any of the plurality of ports;

transmitting the packet to an appropriate port of the plurality of ports, where the appropriate port is connected to the destination matching the destination address.

10. A method according to claim 1, wherein:

storing said source address includes storing said source address to an address register when the selected one of the plurality of learning modes is a first-learned mode.

11. A method according to claim 1, wherein:

storing said source address includes overwriting the oldest dynamic source address entry in the source address memory when the selected one of the plurality of learning modes is a last-learned mode.

12. A method according to claim 11, further comprising:

moving an overwrite pointer to the oldest dynamic source address entry before receiving the packet of information, such that said source address can quickly be written over the oldest dynamic source address entry.

13. A method according to claim 11, further comprising:

checking a static bit for at least some of a plurality of existing source address entries in the source address memory in order to determine the oldest dynamic source address entry in the source address memory.

14. A method according to claim 1, wherein:

storing said source address includes discarding said source address when the selected one of the plurality of learning modes is one of a programmed mode and a secure programmed mode.

* * * * *